No. 885,315. PATENTED APR. 21, 1908.
J. S. BARNETT.
COTTON CHOPPER.
APPLICATION FILED AUG. 27, 1907.
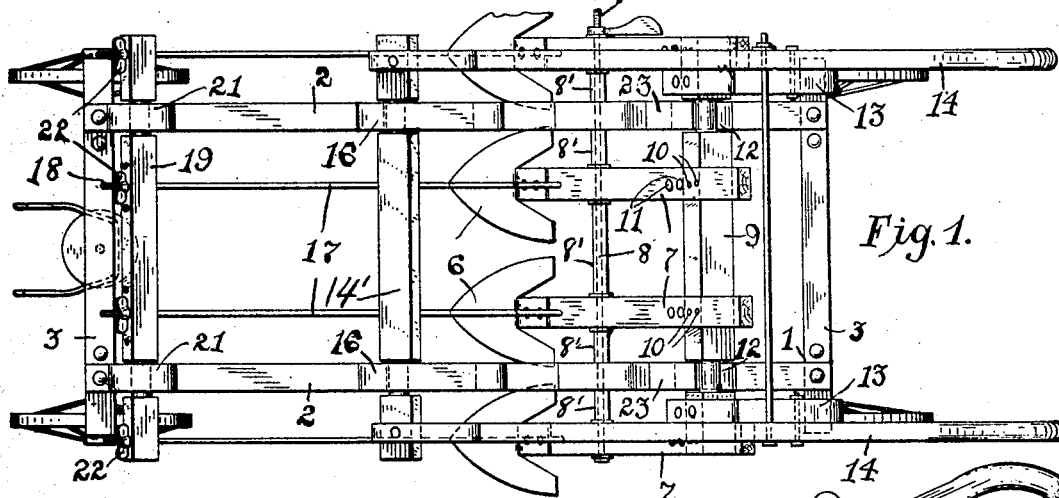
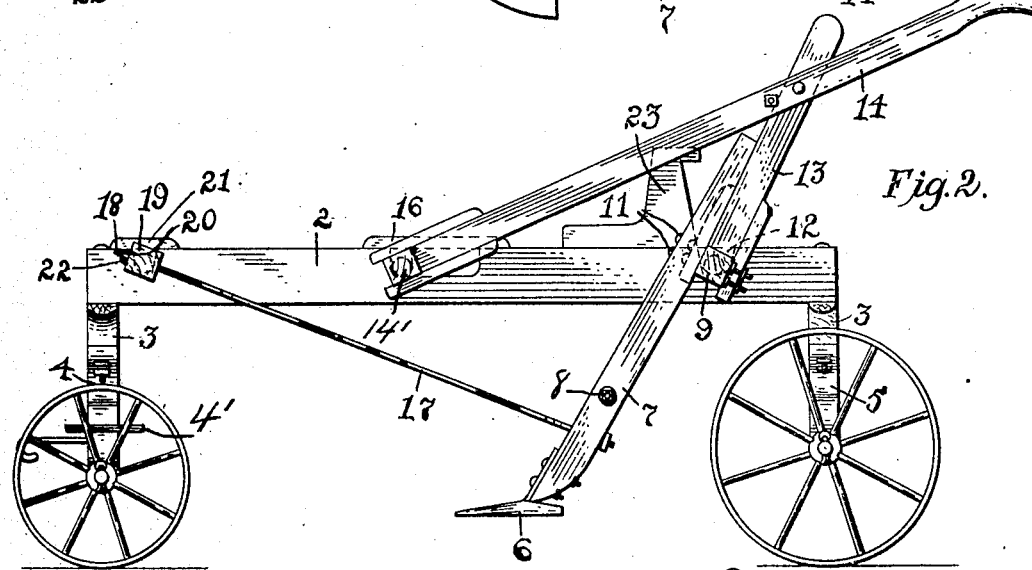
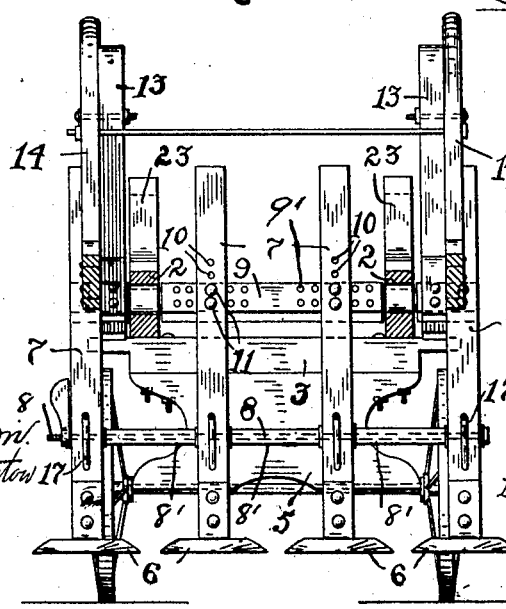

UNITED STATES PATENT OFFICE.

JAMES SAMUEL BARNETT, OF DALLAS, TEXAS.

COTTON-CHOPPER.

No. 885,315.　　　Specification of Letters Patent.　　　Patented April 21, 1908.

Application filed August 27, 1907. Serial No. 390,404.

*To all whom it may concern:*

Be it known that I, JAMES SAMUEL BARNETT, citizen of the United States, residing at Dallas, Texas, have invented certain new and useful Improvements in Cotton-Choppers, of which the following is a specification.

My invention relates to machines for cultivating cotton.

It is the object of my invention to provide a simple apparatus capable of easy manipulation on the part of the operator, it being designed to pass directly across the rows of cotton and the depth of cut being readily regulated by the operator.

The invention consists in the features and combination and arrangement of parts hereinafter described and particularly pointed out in the claim.

In the accompanying drawings, Figure 1 is a plan view of the invention. Fig. 2 a side elevation, and Fig. 3 a cross sectional view.

In these drawings the main frame 1 is of rectangular shape, being composed of longitudinal side bars 2 with cross bars 3 fixed rigidly thereto at the front and rear, the front bar being supported upon a front truck 4 which is swiveled at 4' to the front bar and the rear being supported by a rigidly connected truck 5. The cotton chopper tools or implements 6 are carried by the lower ends of hangers or stocks 7 which are connected together near their lower ends by a cross bar 8, and which at their upper end are connected to a stock beam 9, this connection being an adjustable one so that the tools may be set higher or lower in relation to the main frame as desired. For this purpose a series of holes 10 are formed in the stocks or hangers to receive the bolts 11. The stock beam 9 when in its lowermost position rests in recesses or notches 12 in the side bars 2, and said beam is connected with hangers 13, extending upwardly and joined to the hand bars 14. These hand bars extend rearwardly within convenient reach of the operator, and at their front ends they are connected to a cross bar 14' which passes through slots or openings in the side bars and I prefer to form these slots by cutting away a portion of the side bars and applying over these cutaway portions cover-plates or bars 16. The stocks 7 are further connected with the front of the main frame by means of rods 17 passing through the said stocks and having heads thereon, these rods being threaded at 18 and passing through a front cross bar 19. This front cross bar is pivotally mounted in the main frame for which said frame may be notched at 20, the notch being covered by a plate 21. The screw threaded portion of the rod 17 receives wing nuts 22, and by turning these the tools may be adjusted in position.

I provide on the longitudinal main bars of the frame, catches 23 which overlie the stock beam. The stock beam together with the stocks and tools may be raised by elevating the handle and this movement may continue until the beams strike the catches and the operator by continuing the lifting movement may raise the rear portion of the machine so that it may be readily turned around on the front truck. The distance laterally between the tools may be varied to suit the plants for which purpose I provide sleeves 8' between the stocks and through which the bar 8 passes so that providing sleeves of different length the width of space between the stocks may be adjusted. Of course the bolts 11 must be placed in the proper holes 9' in the beam 9 to suit said adjustment and I provide a series of holes in the cross bar 19 for the rods 17 so that said rods may also be adjusted to correspond with the adjustment of the stocks.

It will be understood that the machine is adapted to pass crosswise of the rows or ridges and it is therefore a crosswise cotton chopper. In passing from one ridge or row to another the operator may lift the stock beam with the tools, as desired, so as to cut any depth that he may wish. By adjusting the wing nuts and also adjusting the stocks the position of the tools may be changed as desired. The number of stocks or tools can be increased or diminished to suit the requirements.

I claim as my invention:—

1. In combination in a cotton chopper, a frame having front and rear trucks, a handle pivotally mounted on the main frame, a stock beam, stocks depending therefrom, and carrying the tools and hangers connecting the stock beam with the handle, substantially as described.

2. In combination, a main frame, a handle pivotally connected thereto, a stock beam, stocks depending therefrom and carrying the tools, hangers connecting the stock beam with the handle, a pivotally mounted cross bar at the front of the machine and rods connecting the stocks with the said cross bar and adjustably connected to said cross bar, substantially as described.

3. In combination with a main frame, a handle pivotally mounted thereon, a stock beam, stocks depending therefrom and carrying the tools, hangers connecting the stock beam with the handle, catches to limit the upward movements of the stock beam, and front and rear trucks upon which the main frame is supported, substantially as described.

4. In combination, a main frame, a stock beam, stocks depending therefrom and carrying the tools, handles, a cross bar connecting the handles and passing through slots in the main frame and hangers connecting the stock beam with the handles, substantially as described.

5. A cotton chopper comprising a main frame, a cross rod having sliding movement therein handles connected to said rod, a stock beam movable in said frame, hangers connecting said beam to the handles, stocks adjustably carried by the beam, a rod passing through the stocks beneath the frame and interchangeable sleeves on said rod for separating the stocks.

In testimony whereof I affix my signature in presence of two witnesses.

JAMES SAMUEL BARNETT.

Witnesses:
 D. W. KELLEY,
 W. F. WILLIAMS.